United States Patent
Yun et al.

(10) Patent No.: US 10,144,413 B2
(45) Date of Patent: Dec. 4, 2018

(54) ANTI-JERK CONTROL SYSTEM AND METHOD OF ECO-FRIENDLY VEHICLE

(71) Applicants: Hyundai Motor Company, Seoul (KR); Kia Motors Corporation, Seoul (KR)

(72) Inventors: Young Min Yun, Incheon (KR); Jae Sung Bang, Gyeonggi-do (KR); Hong Chul Shin, Seoul (KR); Won Woo Suh, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 80 days.

(21) Appl. No.: 15/352,789

(22) Filed: Nov. 16, 2016

(65) Prior Publication Data

US 2017/0313299 A1    Nov. 2, 2017

(30) Foreign Application Priority Data

May 2, 2016    (KR) .................. 10-2016-0054155

(51) Int. Cl.
*B60W 20/15* (2016.01)
*B60W 20/11* (2016.01)
(Continued)

(52) U.S. Cl.
CPC .............. *B60W 20/15* (2016.01); *B60K 6/22* (2013.01); *B60L 11/18* (2013.01); *B60W 20/11* (2016.01);
(Continued)

(58) Field of Classification Search
CPC ................ B60W 20/15; B60W 20/11; B60W 2510/081; B60W 2550/142;
(Continued)

(56) References Cited

U.S. PATENT DOCUMENTS 5,832,400 A * 11/1998 Takahashi .............. B60K 31/00
701/53
8,825,340 B2    9/2014 Kim et al.
(Continued)

FOREIGN PATENT DOCUMENTS

JP    H10300861 A    11/1998
JP    2005-102492 A    4/2005
(Continued)

*Primary Examiner* — Calvin Cheung
(74) *Attorney, Agent, or Firm* — Mintz Levin Cohn Ferris Glovsky and Popeo, P.C.; Peter F. Corless

(57) ABSTRACT

An anti-jerk control system and method of an eco-friendly vehicle are provided to prevent a driver from sensing a difference in vehicle starting at an initial stage when the vehicle is parked on a downhill road. The anti-jerk control method uses a motor as a driving source and includes calculating an actual speed of the motor, calculating a model speed of the motor, and acquiring a gradient of a road, on which the vehicle is located, using a gradient detector. Additionally, the method includes determining a speed offset value that corresponds to the acquired gradient, compensating the model speed by the speed offset value, and calculating a motor vibration component using a difference between the compensated model speed and the actual speed of the motor. Then, anti-jerk compensation torque is calculated using the calculated motor vibration component.

8 Claims, 6 Drawing Sheets

(51) Int. Cl.
  *B60K 6/22*   (2007.10)
  *B60L 11/18*  (2006.01)
  *B60W 30/18*  (2012.01)
  *B60W 30/20*     (2006.01)

(52) U.S. Cl.
  CPC ....... *B60W 30/18027* (2013.01); *B60W 30/20* (2013.01); *B60W 2510/081* (2013.01); *B60W 2550/142* (2013.01); *B60W 2710/081* (2013.01); *B60W 2710/083* (2013.01); *B60Y 2200/91* (2013.01); *B60Y 2200/92* (2013.01); *B60Y 2300/181* (2013.01); *B60Y 2300/20* (2013.01); *B60Y 2300/60* (2013.01); *Y02T 10/7258* (2013.01); *Y10S 903/903* (2013.01)

(58) Field of Classification Search
  CPC .... B60W 2710/083; B60K 6/22; B60L 11/18; B60Y 2200/91; B60Y 2200/92; B60Y 2300/181; B60Y 2300/20; B60Y 2300/60; Y10S 903/903
  See application file for complete search history.

(56) References Cited

U.S. PATENT DOCUMENTS

| | | | |
|---|---|---|---|
| 8,874,297 B2 | 10/2014 | Bang | |
| 9,037,364 B2 | 5/2015 | Bang et al. | |
| 2011/0112709 A1* | 5/2011 | Park | B60K 6/448 701/22 |

FOREIGN PATENT DOCUMENTS

| | | |
|---|---|---|
| JP | 2015-043669 A | 3/2015 |
| KR | 2013-0002713 A | 1/2013 |
| KR | 10-1438628 B1 | 9/2014 |
| KR | 10-1448746 B1 | 10/2014 |

* cited by examiner

ANTI-JERK CONTROL SYSTEM AND METHOD OF ECO-FRIENDLY VEHICLE

CROSS-REFERENCE TO RELATED APPLICATION

This application claims under 35 U.S.C. § 119(a) the benefit of priority to Korean Patent Application No. 10-2016-0054155 filed on May 2, 2016, the entire contents of which are incorporated herein by reference.

BACKGROUND

(a) Technical Field

The present disclosure relates to an anti-jerk control system and method of an eco-friendly vehicle, and more particularly, to an anti-jerk control system and method of an eco-friendly vehicle which prevent a driver from feeling a difference in vehicle starting at an initial stage when the vehicle is parked on a downhill road.

(b) Background Art

In general, a hybrid electric vehicle (HEY) is driven using an internal combustion engine (ICE) and an electric motor as driving sources. Since the HEY uses both energy of fossil fuel and electric energy, the HEY is an eco-friendly vehicle which reduces exhaust gas and improves fuel efficiency.

As one example of an HEY, a transmission mounted electric device (TMED)-type powertrain, in which a driving motor and a transmission are combined, includes an engine and the driving motor disposed in series as driving sources to operate a vehicle, an engine clutch is interposed between the engine and the driving motor to supply power or to cut off power. The transmission achieves power transmission of the engine and the driving motor and transmits power to a drive shaft, and a hybrid starter and generator (hereinafter, referred to as an "HSG") is connected to the engine to transmit power thereto.

Particularly, the engine clutch connects power or cuts off power between the two driving sources, i.e., the engine and the driving motor, to drive the vehicle through a closing or opening operation. Further, a battery as a power source (electricity source) of the vehicle is connected to the driving motor and the HSG via an inverter to be chargeable and dischargeable, and the inverter converts direct current (DC) current of the battery into three-phase alternating current (AC) and then transmits the three-phase AC current to the driving motor and the HSG to drive the driving motor and the HSG.

The HSG is a device which executes integrated functions of a starter motor and a generator in a hybrid vehicle, differently from a general internal combustion engine vehicle in which a starter motor and a generator are installed separately. The HSG transmits power thereof to the engine via a power transmission unit to start operation of the engine or to generate power using rotary force transmitted from the engine during driving, and charges the battery using electric energy generated during generation of power. For example, in a TMED-type hybrid vehicle, during driving in a serial mode, after an engine is started under the condition that an engine clutch is opened, engine torque is transmitted to an HSG to charge a battery by the HSG operated as a generator, and a driving motor is driven by electrical energy of the battery to drive the vehicle.

Such a hybrid vehicle may be driven by effectively combining engine power and motor power. Further, the hybrid vehicle may include, as controllers configured to execute cooperative control, a hybrid control unit (HCU) configured to execute the overall operation of the hybrid vehicle as a high-level controller, a battery management system (BMS) configured to manage operation of a battery, a motor control unit (MCU) configured to operate a motor, and a transmission control unit (TCU) configured to operate a transmission.

These components of the hybrid vehicle are obvious to those skilled in the art and a detailed description thereof will thus be omitted. The above hybrid vehicle may be driven in various modes, such as an electric vehicle (EV) mode, i.e., a pure electric vehicle mode using only power of the driving motor, a hybrid electric vehicle (HEY) mode using both engine power and motor power, an energy regeneration mode in which braking and inertia energy are recovered through power generation by the motor to charge the battery during braking of the vehicle or driving of the vehicle by inertia, etc.

As described above, the hybrid vehicle uses mechanical energy of the engine and electrical energy of the battery together, uses optimum operating areas of the engine and the motor, and recovers energy to the motor during braking or coasting (inertia driving), thus improving fuel efficiency and achieving effective energy usage. Since the engine and the automatic transmission are combined using the engine clutch instead of a torque converter, the hybrid vehicle may not acquire mechanical damping effects of the conventional torque converter.

Since eco-friendly vehicles, including hybrid vehicles and pure electric vehicles driving using a motor without use of an engine, exclude separate damping elements or reduce damping elements, generation of vibration of a drive shaft and generation of vibration, such as shock or jerk (momentary rapid movement), occur during speed change, tip-in/out (e.g., engagement or disengagement of an accelerator pedal), and closing of an engine clutch, thus reducing ride comfort and drivability. In other words, damping elements present between torque sources (e.g., the engine, the motor, etc.) and a driving system are excluded or reduced and thus, vibration from the torque sources or vibration from the outside may not be effectively dampened.

In order to solve such a problem, as a vibration suppressing method, an anti-jerk control method, in which torque output of a motor is adjusted using anti-jerk compensation torque calculated based on a model speed, is suggested. According to such a control method, when a TMED-type hybrid vehicle is stopped and then restarted, anti-jerk control by an MCU is executed to reduce surge and jerk of a motor speed which may occur at an initial stage of starting the vehicle. However, on a downhill road, when the stopped vehicle is restarted by disengagement of a brake pedal, a dual sense of starting of the vehicle occurs due to influence of movement of the vehicle by inertia and anti-jerk control of the MCU.

SUMMARY

The present invention provides an anti-jerk control system and method of an eco-friendly vehicle which prevent a driver from sensing or feeling a difference in vehicle starting at an initial stage when the vehicle is parked on a downhill road by improving a conventional anti-jerk torque control method.

In one aspect, the present invention provides an anti-jerk control method of an eco-friendly vehicle driving using a motor as a driving source that may include calculating an actual speed of the motor, calculating a model speed of the motor, acquiring a gradient of a road, on which the vehicle is located, using a gradient detector, determining a speed offset value that corresponds to the acquired gradient, compensating the model speed by the speed offset value, calculating a motor vibration component using a difference between the compensated model speed and the actual speed of the motor, and calculating anti-jerk compensation torque using the calculated motor vibration component. The vehicle is then started using the calculated anti-jerk compensation torque to reduce the surge and jerk of motor speed when the vehicle is parked on a downhill road.

In an exemplary embodiment, in the determination of the speed offset value, the speed offset value that corresponds to the acquired gradient may be determined using setup information including speed offset values set according to gradients. In addition, the anti-jerk control method may further include compensating a motor torque command using the calculated anti-jerk compensation torque, and adjusting driving of the motor based on the compensated motor torque command.

In another aspect, the present invention provides an anti-jerk control system of an eco-friendly vehicle driving using a motor as a driving source that may include a gradient detector configured to acquire a gradient of a road on which the vehicle is located and a motor control unit (MCU) configured to receive a value detected by the gradient detector and to adjust driving of the motor, the MCU executes a command to perform the above-described anti-jerk control method.

In an exemplary embodiment, the MCU may include an actual speed calculator configured to calculate an actual speed of the motor, a speed offset calculator configured to acquire the gradient of the road where the vehicle is located by receiving the value detected by the gradient detector, and to determine a speed offset value that corresponds to the acquired gradient, a model speed calculator configured to calculate a model speed of the motor, to receive the determined speed offset value, and to calculate a compensated model speed by compensating the calculated model speed by the speed offset value, a vibration component calculator configured to calculate a motor vibration component using a difference between the compensated model speed and the actual speed of the motor, and a compensation torque generator configured to calculate anti-jerk compensation torque using the calculated motor vibration component.

In addition, the speed offset calculator may be configured to determine the speed offset value that corresponds to the acquired gradient using setup information including speed offset values set according to gradients. The MCU may be configured to compensate a motor torque command using the calculated anti-jerk compensation torque, and adjust driving of the motor based on the compensated motor torque command.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
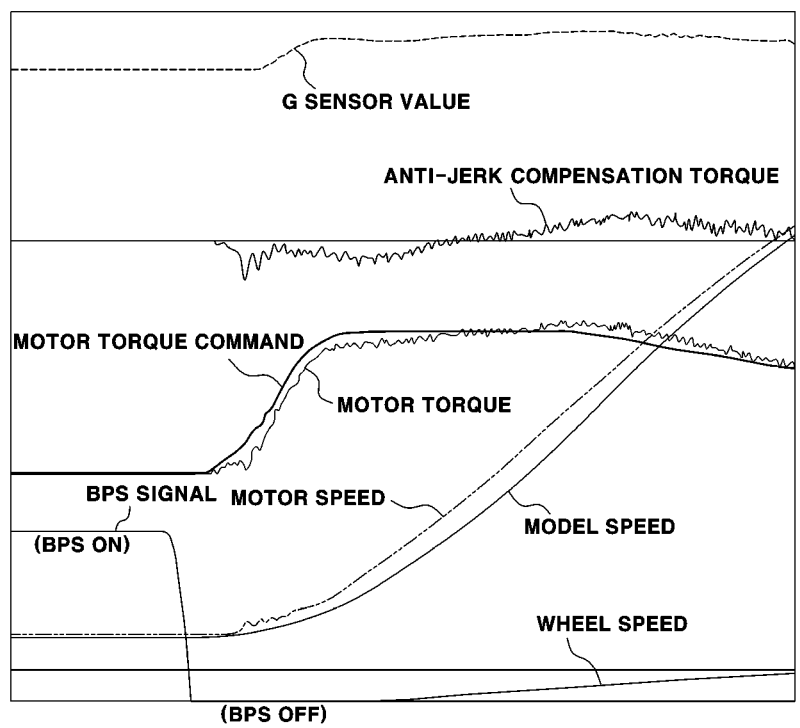
FIG. 1 is a graph illustrating increase of a motor speed when conventional anti-jerk control is executed at an initial stage of starting of a vehicle on a flat road according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other exemplary embodiments within the spirit and scope of the invention as defined by the appended claims. In the following description of the embodiments, it will be interpreted that the term "including" does not mean exclusion of other elements but means presence of other elements, unless stated otherwise.

The present invention relates to an anti-jerk control method which may prevent a drive from sensing a difference in vehicle starting at an initial stage when the vehicle is parked on a downhill road, and the anti-jerk control method may be applied to eco-friendly vehicles, such as hybrid vehicles, pure electric vehicles, fuel cell vehicles, etc.

In conventional eco-friendly vehicles, such as hybrid vehicles, surge and jerk of a motor speed are reduced through anti-jerk control by an MCU at an initial stage of starting of a vehicle, and the present invention provides an anti-jerk control system and method of an eco-friendly vehicle which may prevent a sense of difference in vehicle starting at an initial stage when the vehicle is parked on a downhill road by improving the conventional MCU anti-jerk control method.

FIG. 1 is a graph illustrating increase of a motor speed when conventional anti-jerk control is executed at an initial stage of vehicle starting on a flat road according to the related art. The graph of FIG. 1 shows the value of a G sensor installed within the vehicle, anti-jerk compensation torque (e.g., vibration reduction torque), a motor torque command, motor torque, a brake pedal switch (BPS) signal, a motor speed, a model speed, and a wheel speed. As shown in FIG. 1, when a brake pedal is disengaged (e.g., the BPS off; no pressure is exerted onto brake pedal), the vehicle starts to drive according to a motor torque command and, at this time, a motor speed, a model speed, and a wheel speed are increased. At such an initial stage of starting, anti-jerk compensation torque is calculated and applied, thereby preventing surge and jerk of the motor speed.

Figure 2:
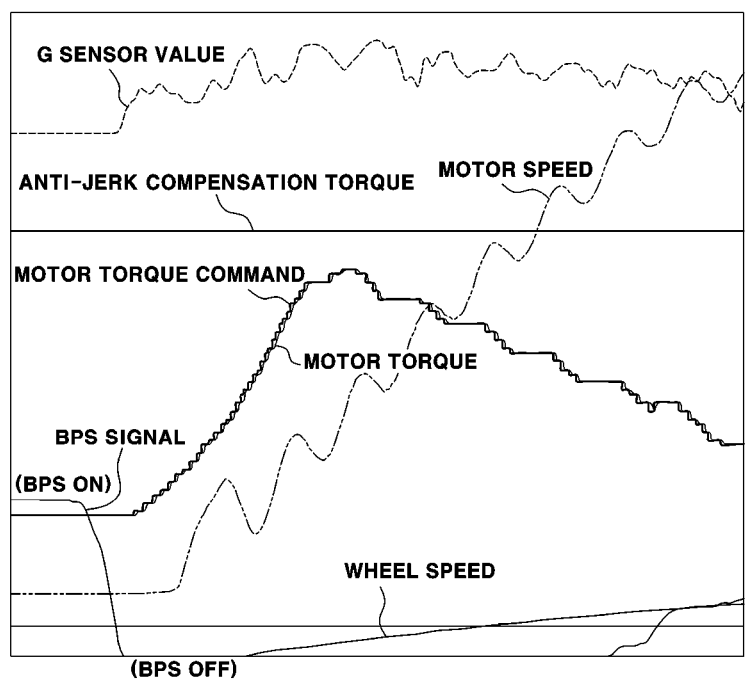
FIG. 2 is a graph illustrating a state of the vehicle when conventional anti-jerk control is off according to the related art.

FIG. 2 is a graph illustrating a state of the vehicle when conventional anti-jerk control is off according to the related art. When anti-jerk control is not executed, anti-jerk compensation torque is not applied and thus rapid change of the motor speed, i.e., surge and jerk, occurs. In anti-jerk control, a model speed is calculated from a wheel speed, inconsistency between the model speed and the motor speed occurs at the initial stage of starting the vehicle, in which wheels start to rotate, due to resolution of a wheel speed sensor and distortion of a driving system.

Figure 3:
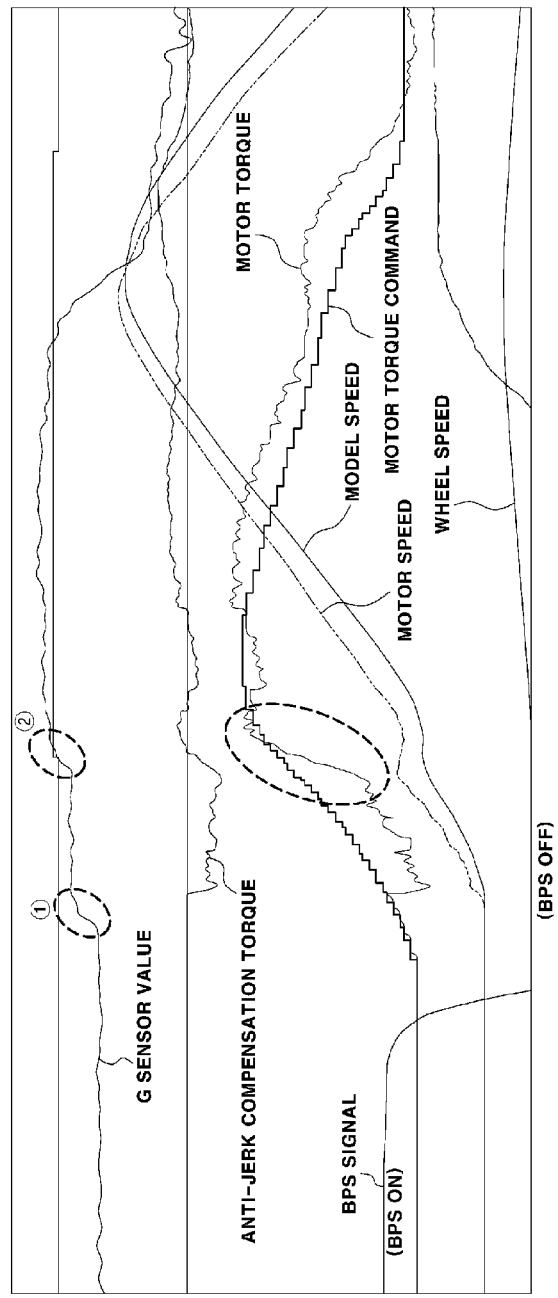
FIG. 3 is a graph illustrating a generation of a dual sense of starting, when the vehicle parked on a downhill road is started after pressing of a brake pedal of the vehicle is released according to the related art.

Such inaccuracy of the model speed in an ultra-low speed region increases when the vehicle drives on a downhill road, anti-jerk compensation torque is miscalculated due to inaccuracy of the model speed, and, thus, when the vehicle starts to drive after disengagement of the brake pedal (the BPS off) on a downhill road, the vehicle may slide due to weight of the vehicle ($\hat{1}$) and then the vehicle may slide further by anti-jerk compensation torque ($\hat{2}$), as exemplarily shown in FIG. 3, thereby generating a dual sense of starting.

With reference to FIG. 3, it may be understood that, during starting of the vehicle after disengagement the brake pedal (the BPS off) on the downhill road, there is a substantial difference between an actual motor speed and a motor model speed due to inaccuracy of the model speed. Therefore, an improved anti-jerk control system and method, which may solve problems caused by generation of an error of the model speed during driving on the downhill road in calculation of the model speed used to calculate anti-jerk compensation speed, will be disclosed.

Figure 4:
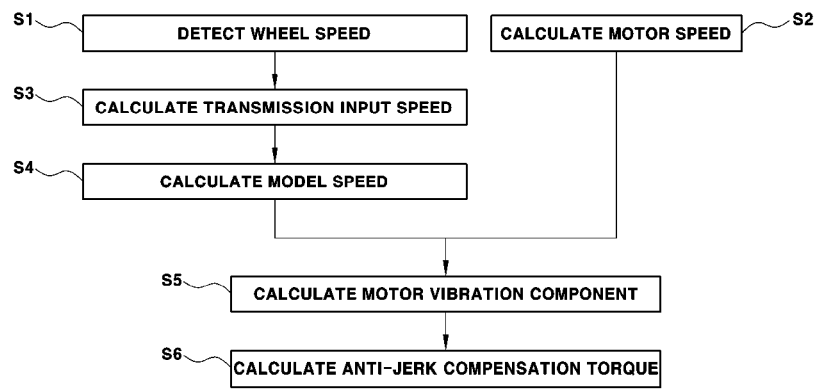
FIG. 4 is a flowchart illustrating a conventional anti-jerk control process according to the related art.

First, a conventional anti-jerk control method applied to an eco-friendly vehicle driving using motor power, such as a hybrid vehicle according to the related art, will be described below. As exemplarily shown in FIG. 4, a conventional anti-jerk control method of an eco-friendly vehicle includes detecting a wheel speed using a wheel speed sensor (S1), calculating an actual speed of a motor (S2), calculating a transmission input speed using the detected wheel speed information (S3), calculating a model speed of the motor using the calculated transmission input speed information (S4), calculating a motor vibration component using a difference between the calculated model speed and actual speed of the motor (S5), and calculating anti-jerk compensation torque using the motor vibration component (S6).

Elements of an anti-jerk control system used to execute the respective above-described operations may be included in a motor control unit (MCU), an actual speed calculator of the MCU may be configured to calculate the actual speed of the motor using known technology (S2). Thereafter, a model speed calculator of the MCU is configured to calculate the model speed, i.e., a speed of the motor in a non-vibration state (S4), and a vibration component calculator of the MCU is configured to calculate the motor vibration component based on a difference between the model speed and the actual speed of the motor (S5). Further, a compensation torque generator of the MCU is configured to calculate anti-jerk compensation torque based on the motor vibration component extracted from the difference between the model speed and the actual speed of the motor (S6).

The above-described anti-jerk compensation torque is used to compensate for a motor torque command, and reduction of vibration may be achieved by adjusting driving of the motor (i.e., torque output of the motor) based on the motor torque command compensated by the anti-jerk compensation torque. The compensated motor torque command has a command value to drive and adjust the driving motor to output torque required by the driving motor to drive the vehicle. The compensated motor torque command is a final torque command to reduce vibration, acquired by compensating the motor torque command by the anti-jerk compensation torque.

Such a final compensated motor torque command is acquired by compensating the motor torque command, transmitted from a hybrid control unit (HCU), by the anti-jerk compensation torque calculated by the MCU during the anti-jerk control process, and the MCU is configured to adjust motor torque based on the compensated motor torque command. The above anti-jerk control process is disclosed in detail in U.S. Pat. No. 8,874,297 filed by the applicant of the invention and registered and, a detailed description thereof will thus be omitted.

During the anti-jerk control process in which vibration generated from the motor and a drive shaft is reduced through motor torque control, vibration reduction performance varies according to accuracy in extraction of the vibration component and thus it is important to extract an accurate vibration component. Further, to extract the accurate vibration component of the motor (and the drive shaft), it is necessary to accurately calculate a model speed.

To extract the vibration component of the motor, an ideal model of the motor, i.e., a model in which an ideal motor speed (model speed) in a non-vibration state may be calculated, is designed, a model speed, i.e., a motor speed including no vibration component, is calculated using the model, and a vibration component is extracted using a difference between the calculated model speed and the actual speed of the motor. Particularly, when the model speed is accurately calculated as an ideal motor speed including no vibration component, a more accurate vibration component may be extracted by calculating a difference between the two values, but the actually calculated model speed has an error, as compared to the ideal motor speed including no vibration component.

Further, to prevent the generation of a sense of difference in vehicle starting at an initial stage when the vehicle is located on a downhill road, calculation of a model speed, in which a gradient of the road (e.g., a road slope or incline) is reflected, is required. Therefore, the present invention further includes a process of acquiring a gradient of a road, on which a vehicle is currently parked, from a value sensed by a G sensor (e.g., a longitudinal acceleration sensor) mounted within the vehicle, calculating a speed offset value that corresponds to the current road gradient during starting of the vehicle, and compensating a model speed, acquired using a transmission input speed, etc., by using the calculated speed offset value.

Figure 5:
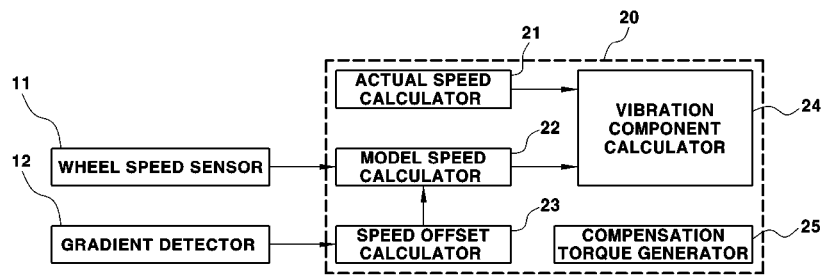
FIG. 5 is a block diagram of an anti-jerk control system of an eco-friendly vehicle in accordance with one exemplary embodiment of the present invention.
Figure 6:
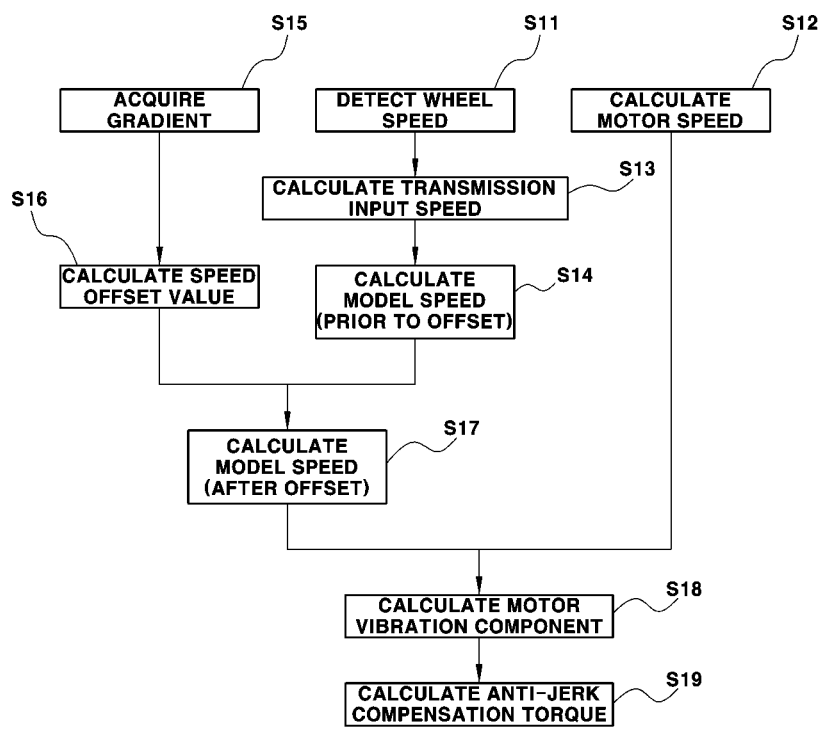
FIG. 6 is a flowchart illustrating an anti-jerk control process of an eco-friendly vehicle in accordance with one exemplary embodiment of the present invention.

FIG. 5 is a block diagram of an anti-jerk control system of an eco-friendly vehicle in accordance with one exemplary embodiment of the present invention, and FIG. 6 is a flowchart illustrating an anti-jerk control process of an eco-friendly vehicle in accordance with one exemplary embodiment of the present invention. In FIG. 5, a motor control unit (MCU) 20 may be configured to execute a command to perform the anti-jerk control method in accordance with one exemplary embodiment of the present invention, which will be described later, and respective elements of the anti-jerk control system included in the MCU 20 may be formed as a software program module executed by a microprocessor.

In other words, the MCU 20 may include one or more microprocessors operated by a predetermined program, and the predetermined program may include a series of commands to execute respective operations included in the anti-jerk control method in accordance with one exemplary embodiment of the present invention, which will be described later. The method to be described herein below may be executed by an overall controller. As exemplarily shown in FIG. 6, the anti-jerk control method in accordance with one exemplary embodiment of the present invention may further include acquiring a value (e.g., a road gradient) detected by a gradient detector on which the vehicle is located, from a value sensed by a G sensor (S15), calculating a speed offset value that corresponds to the acquired gradient of the road (S16), and calculating a compensated model speed by compensating a model speed by the acquired speed offset value (S17).

Such a process may be executed by a speed offset calculator 23 and a model speed calculator 22 of the MCU 20 (e.g., the overall controller). The speed offset calculator 23 may be configured to receive the value detected by the gradient detector 12 and acquire gradient information of the road from a sensor (S15), calculate the speed offset value from the acquired gradient information of the road (S16), and transmit the calculated speed offset value to the model speed calculator 22. Additionally, the model speed calculator 22 may be configured to calculate a compensated model speed by compensating a model speed, calculated using transmission input speed information, by the speed offset value transmitted from the speed offset calculator 23 (S17).

Hereinafter, an anti-jerk control process will be described with reference to FIGS. 5 and 6. First, an anti-jerk control method of an eco-friendly vehicle in accordance with one exemplary embodiment of the present invention may include detecting a wheel speed using a wheel speed sensor (S11), calculating an actual speed of a motor using a sensor (S12), calculating a transmission input speed using the detected wheel speed (S13), calculating a model speed of the motor using the calculated transmission input speed (S14), acquiring a gradient of a road on which the vehicle is located using the gradient detector 12 (S15), determining a speed offset value that corresponds to the acquired gradient of the road (S16), compensating the model speed by the speed offset value (S17), calculating a motor vibration component using a difference between the compensated model speed and the actual speed of the motor (S18), and calculating anti-jerk compensation torque using the motor vibration component (S19). Then, using the anti-jerk compensation torque, the driving of the motor may be adjusted to thus drive the vehicle based on the adjustment.

Elements of an anti-jerk control system to execute the respective above-described operations may be included in the MCU 20, an actual speed calculator 21 of the MCU 20 may be configured to calculate the actual speed of the motor using a known technology (S12), and U.S. Pat. No. 8,874,297 discloses technology regarding calculation of the actual speed of a motor. The model speed calculator 22 of the MCU 20 may be configured to calculate a model speed (i.e., a motor speed in a non-vibration state) (S14), and the speed offset calculator 23 may be configured to acquire gradient information from the value detected by the gradient detector 12 (S15) and then calculate a speed offset value from the acquired gradient information (S16).

Further, to calculate the speed offset value (S16), the speed offset calculator 23 may use setup information, such as map data, diagram data, table data, etc., in which speed offset values are set according to gradients. In other words, speed offset values that correspond to respective gradients may be set and stored in the speed offset calculator 23 in advance to allow a speed offset value that corresponds to a current gradient to be acquired from the corresponding current gradient, and the speed offset calculator 23 may be configured to receive a gradient of the road and calculate a speed offset value that corresponds to the gradient from the setup information.

For the setup information, corresponding data values may be set in advance based on various data acquired through research on the same type of vehicle and then stored in the speed offset calculator 23. Thereafter, the speed offset calculator 23 may be configured to transmit the calculated speed offset value to the model speed calculator 22. Then, the model speed calculator 22 may be configured to calculate a transmission input speed using the detected wheel speed information (S13), calculate a model speed using the calculated transmission input speed information (S14), and calculate a compensated model speed by compensating the calculated model speed by the speed offset value (S17).

Further, the actual speed of the motor calculated by the actual speed calculator 21 and the compensated model speed calculated by the model speed calculator 22 may be transmitted to a vibration component calculator 24 of the MCU 20, and the vibration component calculator 24 may be configured to calculate a vibration component of the motor based on a difference between the actual speed and the compensated model speed of the motor (S18). A compensation torque generator 25 of the MCU 20 may be configured to calculate anti-jerk compensation torque based on the motor vibration component extracted from the actual speed and the compensated model speed (S19).

The above calculated anti-jerk compensation torque may be used to compensate for a motor torque command in the MCU 20, and reduction of vibration may be achieved by adjusting the driving of the motor (i.e., torque output of the motor) based on the motor torque command compensated by the anti-jerk compensation torque. The compensated motor torque command has a command value to drive and adjust the driving motor to output torque required by the driving motor to drive the vehicle. The compensated motor torque command is a final torque command to reduce vibration, acquired by compensating the motor torque command by the anti-jerk compensation torque. Such a final compensated motor torque command may be acquired by compensating the motor torque command, transmitted from a hybrid control unit (HCU; not shown), using the anti-jerk compensation torque calculated during the anti-jerk control process, through the MCU 20, and the MCU 20 may be configured to adjust motor torque according to the compensated motor torque command.

In the above-described anti-jerk control process, calculating the actual speed of the motor by the actual speed calculator 21 (S12), calculating the model speed prior to compensation by the model speed calculator 22 (S11, S13 and S14), calculating the motor vibration component based on the difference between the actual speed of the motor and the model speed by the vibration component calculator 24 (S18), and generating the anti-jerk compensation torque based on the motor vibration component by the compensation torque generator 25 (S19) are the same as the processes of the conventional anti-jerk control process, and a detailed description thereof will thus be omitted. The above anti-jerk control process is disclosed in detail in U.S. Pat. No. 8,874,297 filed by the applicant of the invention and registered and, a detailed description thereof will thus be omitted.

However, the anti-jerk control process of the present invention differs from the conventional anti-jerk control process in that a gradient of a road, on which the vehicle is located, may be calculated, a speed offset value that corresponds to the gradient of the road may be determined, and the model speed calculator 22 may be configured to calculate a compensated model speed by compensating a model speed prior to compensation by the speed offset value so that the compensated model speed may be used to extract a motor vibration component. Thus, the claimed invention provides a more accurate calculation which allows for improved driving.

As described above, calculation of a model speed based on a wheel speed may be inaccurate in an ultra-low speed region and, particularly, a calculation error increases on a downhill road. Such inaccuracy of the model speed in the ultra-low speed region may cause miscalculation of anti-jerk compensation torque and thus motor torque, which does not satisfy reduction of surge and jerk of the motor speed is output. This may cause a sense of difference in starting at an initial stage of starting the vehicle on the downhill road. In the present invention, to overcome limitations of generation of an error of a model speed used to calculate anti-jerk compensation torque by the MCU 20 at the initial stage of vehicle starting on the downhill road, i.e., a model speed calculated based on a wheel speed, a process of offsetting the model speed by movement of the vehicle (e.g., a motor speed increment) due to the weight of the vehicle on the downhill road prior to calculation of a wheel speed in the conventional calculation process is added, and anti-jerk control therethrough is executed, thus providing a more accurate calculation.

Figure 7:
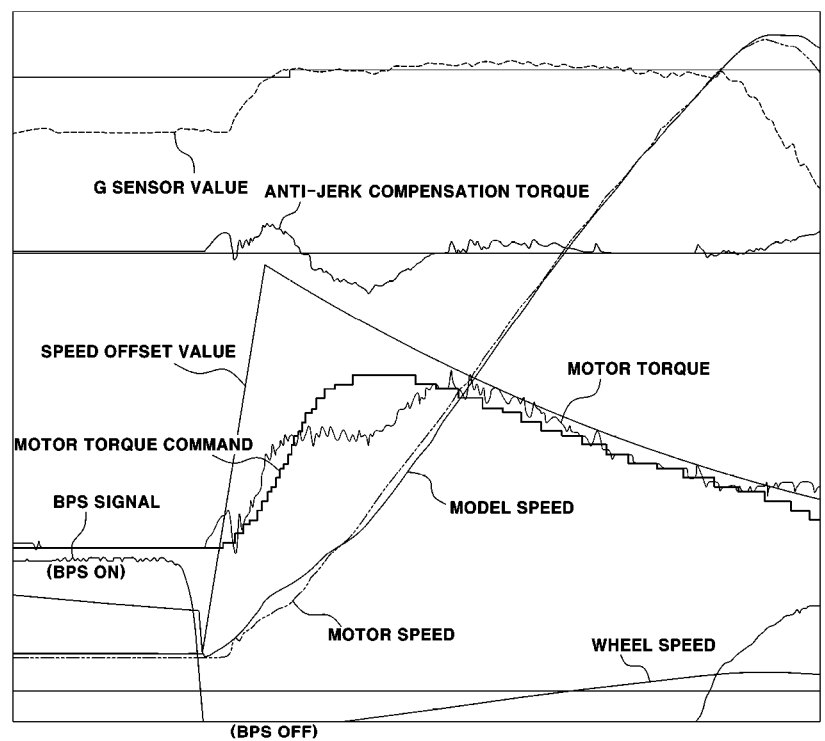
FIG. 7 is a graph showing vehicle data indicating improvement of a sense of starting of a vehicle in accordance with an anti-jerk control method in accordance with an exemplary embodiment of the present invention.

FIG. 7 is a graph showing vehicle data indicating implementation of a soft sense of starting (with reference to a dotted line), and a conventional dual sense of starting may be removed by applying an offset value to a model speed during starting of the vehicle on a downhill road. Therefore, the present invention may overcome inaccuracy at an initial stage of starting of a vehicle, i.e., a limitation of a model speed based on a wheel speed, in anti-jerk control and improve drivability and marketability of the vehicle.

As is apparent from the above description, in a control method of an eco-friendly vehicle in accordance with the present invention, a speed offset value that corresponds to a gradient of a road, on which the vehicle is located, may be determined, a model speed may be compensated by the speed offset value, and then the compensated model speed may be used to calculate a motor vibration component and anti-jerk compensation torque, thereby being capable of overcoming inaccuracy at an initial stage of starting of the vehicle, i.e., a limitation of a model speed based on a wheel speed, in anti-jerk control. Further, generation of a sense of difference in vehicle starting at the initial stage when the vehicle is parked on a downhill road may be prevented, thereby improving drivability and marketability of the vehicle.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An anti-jerk control method of an eco-friendly vehicle driving using a motor as a driving source, comprising:
    calculating, by a controller, an actual speed of the motor;
    calculating, by the controller, a model speed of the motor;
    acquiring, by the controller, a gradient of a road, on which the vehicle is located, using a gradient detector;
    determining, by the controller, a speed offset value that corresponds to the acquired gradient;
    compensating, by the controller, the model speed by the speed offset value;

calculating, by the controller, a motor vibration component using a difference between the compensated model speed and the actual speed of the motor;

calculating, by the controller, anti-jerk compensation torque using the calculated motor vibration component;

compensating, by the controller, a motor torque command using the calculated anti-jerk compensation torque; and adjusting, by the controller, driving of the motor based on the compensated motor torque command.

2. The anti-jerk control method of claim 1, wherein, in the determination of the speed offset value, the speed offset value that corresponds to the acquired gradient is determined using setup information including speed offset values set according to gradients.

3. An anti-jerk control system of an eco-friendly vehicle driving using a motor as a driving source, comprising:

a gradient detector configured to acquire a gradient of a road on which the vehicle is located; and a motor control unit (MCU) configured to receive a value detected by the gradient detector and to adjust driving of the motor.

4. The anti-jerk control system of claim 3, wherein the MCU includes:

an actual speed calculator configured to calculate an actual speed of the motor;

a speed offset calculator configured to acquire the gradient of the road by receiving the value detected by the gradient detector, and to determine a speed offset value that corresponds to the acquired gradient;

a model speed calculator configured to calculate a model speed of the motor, to receive the determined speed offset value, and to calculate a compensated model speed by compensating the calculated model speed by the speed offset value;

a vibration component calculator configured to calculate a motor vibration component using a difference between the compensated model speed and the actual speed of the motor; and a compensation torque generator configured to calculate anti-jerk compensation torque using the calculated motor vibration component.

5. The anti-jerk control system of claim 4, wherein the speed offset calculator is configured to calculate the speed offset value that corresponds to the acquired gradient using setup information including speed offset values set according to gradients.

6. The anti-jerk control system of claim 3, wherein the MCU is configured to compensate a motor torque command using the calculated anti-jerk compensation torque, and adjust driving of the motor based on the compensated motor torque command.

7. A non-transitory computer readable medium containing program instructions executed by a controller for anti-jerk control of an eco-friendly vehicle driving using a motor as a driving source, the computer readable medium comprising:

program instructions that calculate an actual speed of the motor;

program instructions that calculate a model speed of the motor;

program instructions that acquire a gradient of a road, on which the vehicle is located, using a gradient detector;

program instructions that determine a speed offset value that corresponds to the acquired gradient;

program instructions that compensate the model speed by the speed offset value;

program instructions that calculate a motor vibration component using a difference between the compensated model speed and the actual speed of the motor;

program instructions that calculate anti-jerk compensation torque using the calculated motor vibration component;

program instructions that compensate a motor torque command using the calculated anti-jerk compensation torque; and program instructions that adjust driving of the motor based on the compensated motor torque command.

8. The non-transitory computer readable medium of claim 7, wherein, in the determination of the speed offset value, the speed offset value that corresponds to the acquired gradient is determined using setup information including speed offset values set according to gradients.

* * * * *